United States Patent [19]

Henseler

[11] Patent Number: 5,031,929
[45] Date of Patent: Jul. 16, 1991

[54] SAFETY DEVICE FOR THE OCCUPANTS OF A MOTOR VEHICLE

[75] Inventor: Wolfgang Henseler, Tübingen, Fed. Rep. of Germany

[73] Assignee: Daimler-Benz AG, Fed. Rep. of Germany

[21] Appl. No.: 505,900

[22] Filed: Apr. 6, 1990

[30] Foreign Application Priority Data

Apr. 26, 1989 [DE] Fed. Rep. of Germany ....... 3913660

[51] Int. Cl.⁵ ....................... B60R 21/16; B60R 21/22
[52] U.S. Cl. ...................................... 280/730; 280/743
[58] Field of Search ................ 280/730, 731, 732, 743

[56] References Cited

U.S. PATENT DOCUMENTS 3,618,979 11/1971 Gulette ................................ 280/743
3,791,667 2/1974 Haviland .............................. 280/730
3,799,578 3/1974 Hamasaki et al. ................... 280/730
3,897,961 8/1975 Leising et al. ....................... 280/730

FOREIGN PATENT DOCUMENTS 1431098 1/1966 France ................................ 280/730

Primary Examiner—Kenneth R. Rice
Attorney, Agent, or Firm—Evenson, Wands, Edwards, Lenahan & McKeown

[57] ABSTRACT

A safety device for motor vehicles is in the form of an air bag located on the driver side and on the front-seat passenger side to prevent a vehicle occupant from colliding with front interior parts of the passenger compartments. The two filled air bags overlap one another in the middle region of the vehicle land, as seen in a top view, are each designed with a mutual bearing face extending at an angle relative to a transverse axis of the vehicle, thereby preventing an occupant from slipping through between the two air bags.

5 Claims, 1 Drawing Sheet

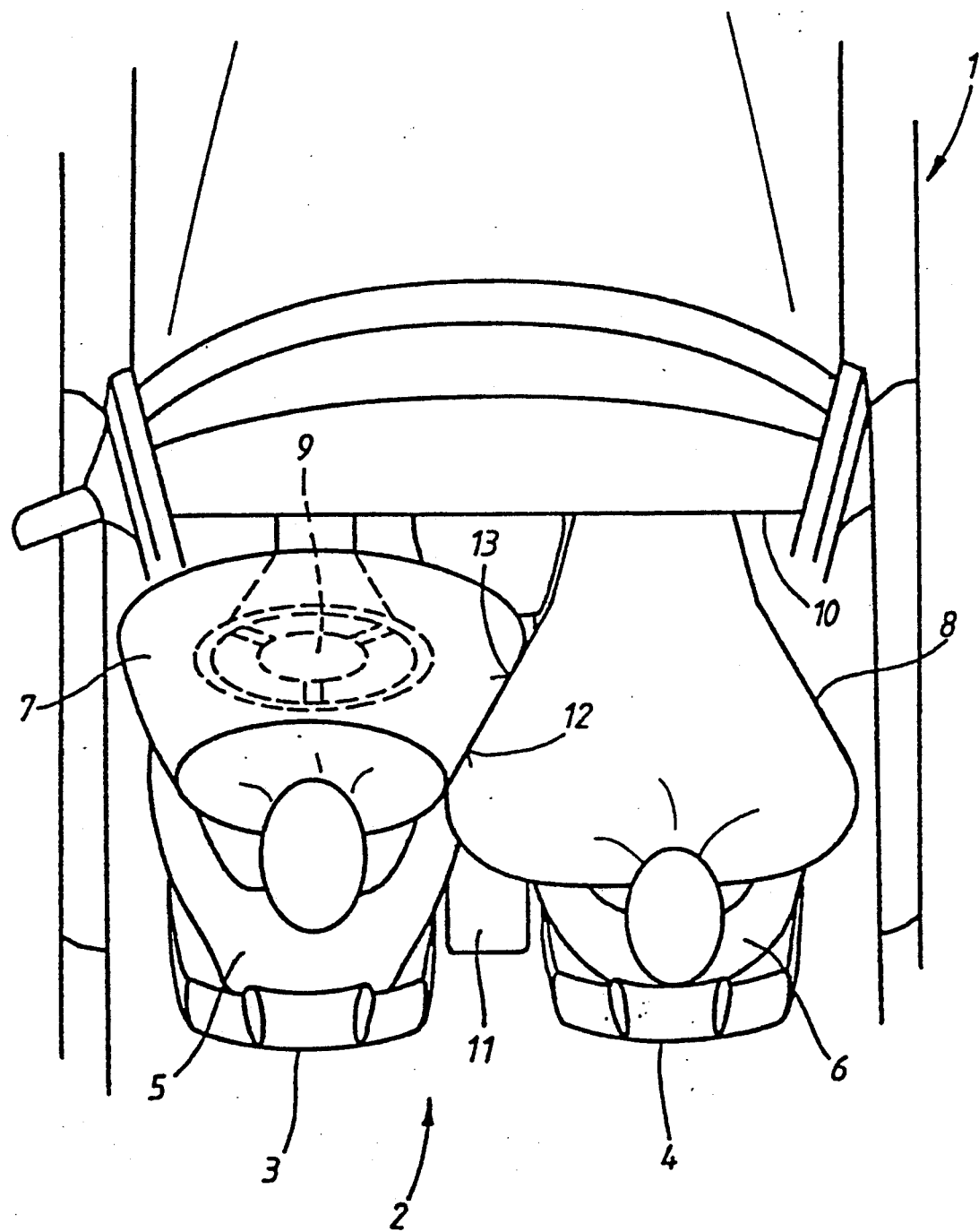

SAFETY DEVICE FOR THE OCCUPANTS OF A MOTOR VEHICLE

BACKGROUND AND SUMMARY OF THE INVENTION

The present invention relates to a safety device for the occupants of a motor vehicle, and more particularly, to an air bag on the driver side and on the passenger side.

It is already known in connection with motor vehicles to accommodate air bags folded in front of a vehicle driver and a front-seat passenger on the vehicle passenger compartment. In the event of an accident, the air bag is filled with gas and inflated in front of the vehicle occupant. The inflated bag safeguards the occupant against a collision with hard front interior parts and thereby protects him or her from injury. It is also known to secure the air bag located on the driver side in a steering-wheel pot and the air bag located on the front-seat passenger side in a container in the dashboard. The air bag located on the front-seat passenger side has a filling volume many times larger than that of the air bag located on the driver side, so that the larger gap between the dashboard and the front-seat passenger can be filled correspondingly.

If a front-seat passenger has not fastened his or her safety belt, however, then he or she could slip off along the large-surface air bag casing if the seat belt has not been fastened as a result of a transverse momentum and go between the two air bags, especially if the vehicle collides obliquely with an obstacle. As a result, there would no longer be any protection for the vehicle occupant against collision.

U.S. Pat. No. 4,265,468 describes a collision-protection device with two protective cushions for three occupants on the front seats of a motor vehicle. In this arrangement, the two cushions overlap one another slightly in the wall regions pointing towards one another, but there is no provision to ensure that they bear on one another in a predetermined way in order to prevent an occupant from slipping through between the protective cushions.

An object of the present invention is to increase the occupant protection, especially of a motor-vehicle occupant not strapped in, against collision with front interior parts as a result of the interaction of an air bag located on the driver side with an air bag located on the front-seat passenger side.

The foregoing object has been achieved by overlapping two air bags in the middle region of the vehicle so as, when seen looking down into the vehicle from above, each bag has a mutual bearing face forming an angle with the longitudinal axis of the vehicle.

Because the two air bags lying against one another overlap in a predetermined or deliberate manner, the transition between the two air bags in the middle region of the vehicle also affords much better protection against collision with the dashboard by a vehicle occupant who, for example, if he is sitting on a back-seat bench of the motor vehicle without being strapped in, is in danger of being thrown forwards through between the front vehicle seats in the event of a collision.

Because the bearing faces are angled (as seen in a top plan view), the two air bags can unfold completely and at the appropriate time, since they do not impede one another. As a result of the mutual bearing of the two air bag faces in the inflated state, it is now also possible for the bags to assist one another in their supporting effect against forces acting at an angle to the alignment of the bearing faces. This mutual support affords an effective opportunity to choose a surface design and/or material of the bearing faces which creates a certain adhesion between the two bags and prevents or makes more difficult a relative movement of the bearing faces of the bags.

When the air bag located on the driver side is arranged in the steering-wheel pot and the air bag located on the front-seat passenger side is arranged in the dashboard (for which reason the dashboard air bag necessarily has a much larger filling volume and in comparison with the steering wheel pot air bag unfolds somewhat more slowly), the overlap slant of the bearing faces should be aligned in such a way that, as seen in a top plan view, the bearing faces of the two air bags extend rotated in the clockwise direction relative to the longitudinal axis of the vehicle, so that the unfolding of the air bag located on the driver side can take place unimpeded, before the air bag located on the front-seat passenger side comes with its bearing face up against that of the air bag located on the driver side.

These and other features, objects and advantages of the present invention will become more apparent from the following detailed description of a presently preferred embodiment.

BRIEF DESCRIPTION OF THE DRAWING

The accompanying sole figure is a top plan view of the front region interior of a vehicle passenger compartment with the front of the vehicle being toward the top constructed according to a preferred embodiment of the invention.

DETAILED DESCRIPTION OF THE DRAWING

In the front region interior of a motor vehicle 1, occupants 5 and 6 sit, respectively, on a driver seat 3 and on a front passenger seat 4. The motor vehicle 1 has just suffered a collision, thereby activating a safety device in accordance with the present invention comprising an air bag 7 located on the driver side and an air bag 8 located on the front-seat passenger side. These bags 7 and 8 prevent the vehicle occupants 5 and 6 from colliding with hard front interior parts.

The air bag 7 located on the driver side is operatively secured in a steering-wheel pot 9 of a steering wheel (shown in dashed lines) and, in the event of a collision, is filled with gas in a known manner by a gas generator (not shown) integrated therein. This results in inflation of the air bag 7 between the occupant 5 and the steering-wheel pot 9 for protection of the occupant 5. The air bag 8 located on the front-seat passenger side is folded together and accommodated in a container in a front dashboard 10 and is likewise filled with gas in a known manner. In the event of a collision, the air bag 8 expands protectively between the dashboard 10 and the front-seat passenger 6.

In order that the transition between the air bags 7 and 8 in the middle region 11 of the vehicle compartment can also be utilized for the protection of the occupants, the two air bags 7, 8 are designed in such a way that they overlap one another in a predetermined or deliberate way in the middle region 11 of the vehicle of the vehicle. As seen in the top plan view, each bag has a mutual bearing face 12, 13 extending in a clockwise rotated position relative to the longitudinal axis of the vehicle as viewed from the back toward the front of the vehicle 1. Now if either vehicle occupant 5 or 6 is thrown forwards towards the dashboard 10 in the middle region 11 of the vehicle 1, the overlap of the two air bags 7 and 8 will prevent that occupant from slipping through the bearing region 12, 13 of the bags and from colliding with hard front interior parts on the dashboard 10. The inclination of the bearing faces 12, 13 in relation to the longitudinal axis of the vehicle ensures that the air bags 7, 8 can unfold unimpeded despite this overlap and, when subjected to collision load by the occupants 5 and 6, can also assist one another in their restraining effect. A clockwise rotation of the bearing faces 12, 13 relative to the longitudinal axis of the vehicle through an angle $\alpha = 45°$ has been found most favorable for the various possible directions of impact against the occupant.

The bearing of the bearing faces 12, 13 on one another can also be improved by constructing the bearing faces 12, 13 with surfaces which adhere firmly to one another by surface configuration and/or material selection. For example, the material can be such so as to increase friction between the surfaces.

In the illustrated arrangement of the air bags 7 and 8 in the motor vehicle 1 in which the air bag 7 located on the driver side is secured in the steering-wheel pot 9 and the air bag 8 located on the front-seat passenger side is secured in the dashboard 10 arranged at a comparatively greater distance from the occupant 6, it is necessary to make the air bag 8 located on the front-seat passenger side considerably more voluminous. Because of this greater volume, the air bag 8 unfolds and fills somewhat more slowly than the air bag 7 located on the driver side. It is desirable for this arrangement if, as seen in top plan view, the bearing faces 12 and 13 of the air bags 7, 8, respectively, are arranged rotated in the clockwise direction relative to the longitudinal axis of the vehicle as viewed from the rear toward the front of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A safety system to prevent occupants of a motor vehicle from colliding with front interior parts of a compartment of the vehicle, comprising an air bag located on the driver side and an air-bag located on the front-seat passenger side, wherein the two air bags are operatively configured and arranged such that, when filled, the bags overlap and contact one another in a middle region of the vehicle compartment in a predetermined manner and, as seen in a top plan view, each bag has a mutual bearing face forming an angle $\alpha$ with respect to the longitudinal axis of the vehicle for providing the contact so as to prevent the occupants from sliding between the air bags.

2. The safety system according to claim 1, wherein the angle $\alpha$ is approximately 45°.

3. The safety system according to claim 1, wherein the air bag located on the driver side is secured in a steering-wheel pot, and, as seen in a top plan view, the bearing faces of the bags are arranged rotated in a clockwise direction relative to the longitudinal axis of the vehicle as viewed from the rear toward the front of the vehicle.

4. The safety systems according to claim 3, wherein the angle $\alpha$ is approximately 45°.

5. The safety system according to claim 1, wherein the bearing faces have respective surfaces adhering firmly to one another.

* * * * *